Sept. 4, 1923.  
F. F. AKERLY  
1,466,655  
AUTOMATIC STARTING AND STOPPING DEVICE FOR GRAPHOPHONES  
Filed April 26, 1918  4 Sheets-Sheet 1

Witness  
Harry S. Gaither

Inventor:  
Frank F. Akerly,  
by Chamberlin & Freudenreich  
Attys

Sept. 4, 1923. 1,466,655
F. F. AKERLY
AUTOMATIC STARTING AND STOPPING DEVICE FOR GRAPHOPHONES
Filed April 26, 1918 4 Sheets-Sheet 2

Witness:
Harry S. Gaither

Inventor:
Frank F. Akerly,
by Chamberlin Freudenreich
Attys

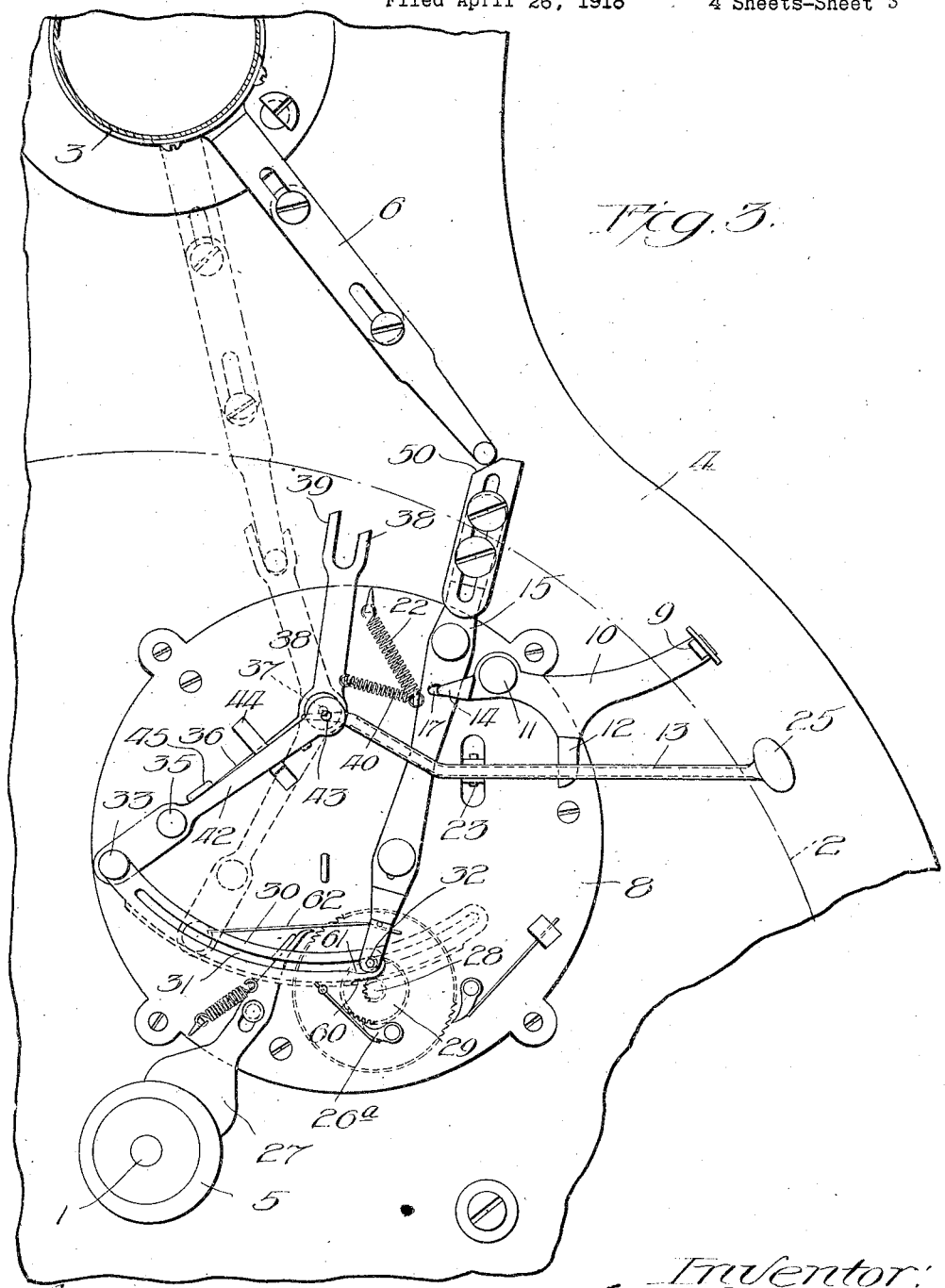

Sept. 4, 1923.  1,466,655
F. F. AKERLY
AUTOMATIC STARTING AND STOPPING DEVICE FOR GRAPHOPHONES
Filed April 26, 1918   4 Sheets-Sheet 4
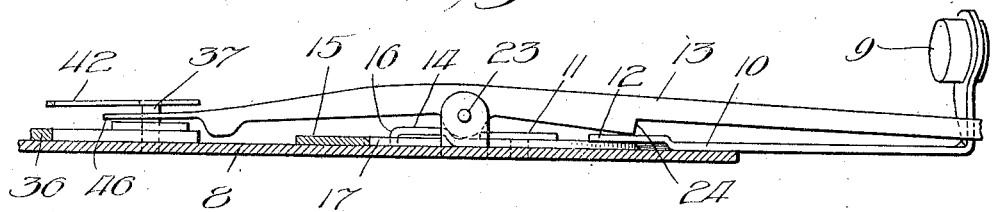
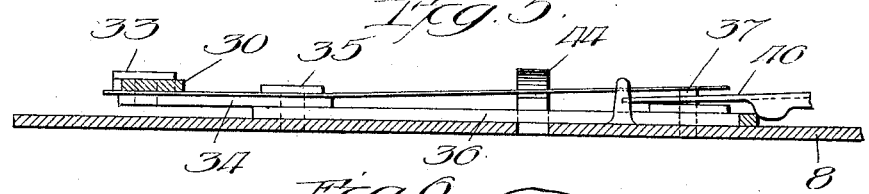
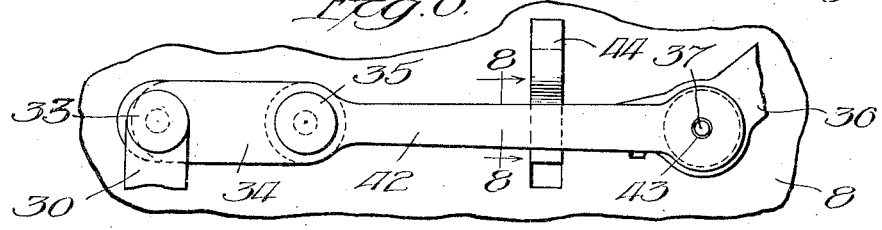
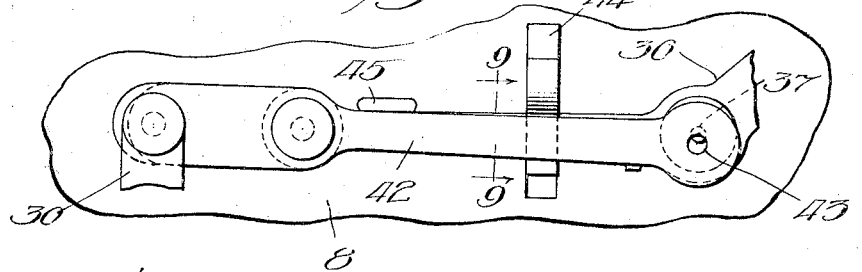
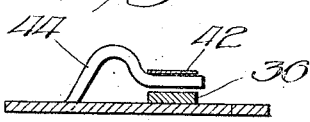
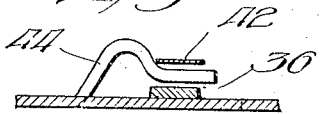
Witness:
Harry S. Guther
Inventor:
Frank F. Akerly,
by Chamberlin Freudenreich
Attys Patented Sept. 4, 1923.

1,466,655

UNITED STATES PATENT OFFICE.

FRANK F. AKERLY, OF CHICAGO, ILLINOIS, ASSIGNOR TO COLUMBIA GRAPHOPHONE MANUFACTURING COMPANY, OF BRIDGEPORT, CONNECTICUT, A CORPORATION OF DELAWARE.

AUTOMATIC STARTING AND STOPPING DEVICE FOR GRAPHOPHONES.

Application filed April 26, 1918. Serial No. 230,957.

*To all whom it may concern:*

Be it known that I, FRANK F. AKERLY, a citizen of the United States, residing at Chicago, county of Cook, and State of Illinois, have invented a certain new and useful Improvement in Automatic Starting and Stopping Devices for Graphophones, and declare the following to be a full, clear, and exact description of the same, such as will enable others skilled in the art to which it pertains to make and use the same, reference being had to the accompanying drawings, which form a part of this specification.

My invention has for one of its objects to produce a simple and efficient attachment for a graphophone by means of which the graphophone will automatically be set in operation when the reproducer arm is moved to engage the needle with the beginning of a record.

A further object of my invention is to produce a simple and novel attachment for graphophones by means of which they may be automatically started in order to begin the playing of a record and thereafter be automatically stopped when the end of the record has been reached.

A further object of my invention is to produce an automatic starting and stopping device for graphophones which performs its functions without requiring the operator to make any adjustment or manipulation of the parts of a graphophone except the mere moving of the reproducer arm.

My invention has for another of its objects to produce a simple and efficient automatic starting and stopping device for a graphophone which may be placed on a graphophone without requiring any change in the adjustments or removal or alteration of the parts of the latter.

The principle of my invention is the same as that set forth in Patent No. 1,226,749 dated May 22, 1917, and, viewed in one of its aspects, my invention may be said to have for its object to simplify and improve and to render more reliable and accurate and also to make more automatic the stopping mechanism disclosed in the aforesaid patent.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of so much of a graphophone, (meaning by graphophone any machine adapted to reproduce sound through the passage of a needle over a record,) as is necessary to show the application of my improved starting and stopping device, the latter being shown in full lines with the parts in the positions they assume at the moment that the machine is automatically stopped at the end of a record, and showing in dotted lines the positions which the parts assume during the automatic resetting process and prior to the starting of the machine;

Fig. 3 is a view similar to Figs. 1 and 2 showing in full lines the positions of the parts at the moment the machine is set in operation and showing in dotted lines the positions which the parts assume just before they assume the positions shown in full lines in Fig. 1;

Fig. 4 is a section on an enlarged scale taken approximately on line 4—4 of Fig. 2;

Fig. 5 is a section on an enlarged scale taken approximately on line 5—5 of Fig. 2;

Fig. 6 is a top plan view on an enlarged scale of a part of the main actuating and trip lever;

Fig. 7 is a view similar to Fig. 6 showing the parts in a different position;

Fig. 8 is a section taken approximately on line 8—8 of Fig. 6; and

Fig. 9 is a section taken approximately on line 9—9 of Fig. 7.

Reference being had to the drawings, 1 represents a revoluble vertical shaft adapted to carry on its upper end a disc-like table, 2, shown in dotted lines only, for supporting a record disc. 3 is the vertical portion of the reproducer arm, at the supported end of the latter; the member 3 being revoluble about its own vertical axis. The parts 1, 2 and 3, together with the supporting casing, 4, may take any usual or preferred forms. All of the parts of my invention, including the brake or other controller for the record-supporting table, may conveniently be combined in a single unit which may be attached as such: there being in addition what may be termed a differential actuator comprising two parts one of which is attached to the driving shaft of the machine while the other is attached and moves with the reproducer arm. In the arrangement shown, one of the actuating members is in the form of an eccentric, 5, attached to the main shaft of the machine just above the casing while the other actuating member is in the form of a finger, 6, adapted to be secured to the reproducer arm radially to the axis about which the latter swings, lying just above the casing of the machine, and being preferably made adjustable in the lengthwise direction so as to permit compensation to be made for differences in the distance between the axis of the shaft and the axis about which the reproducer arm swings in different types and sizes of machines.

Figure 1:
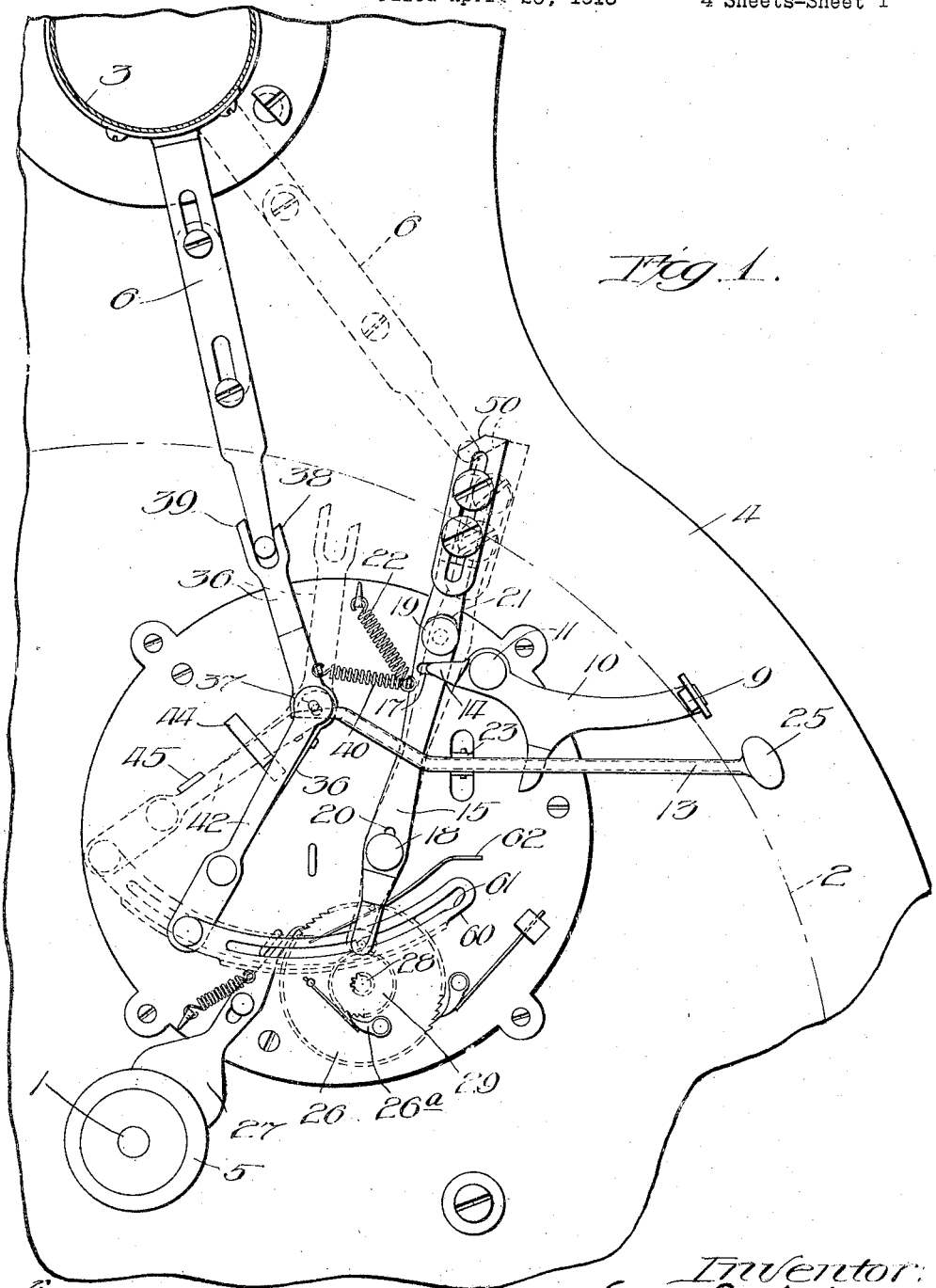
Figure 2:
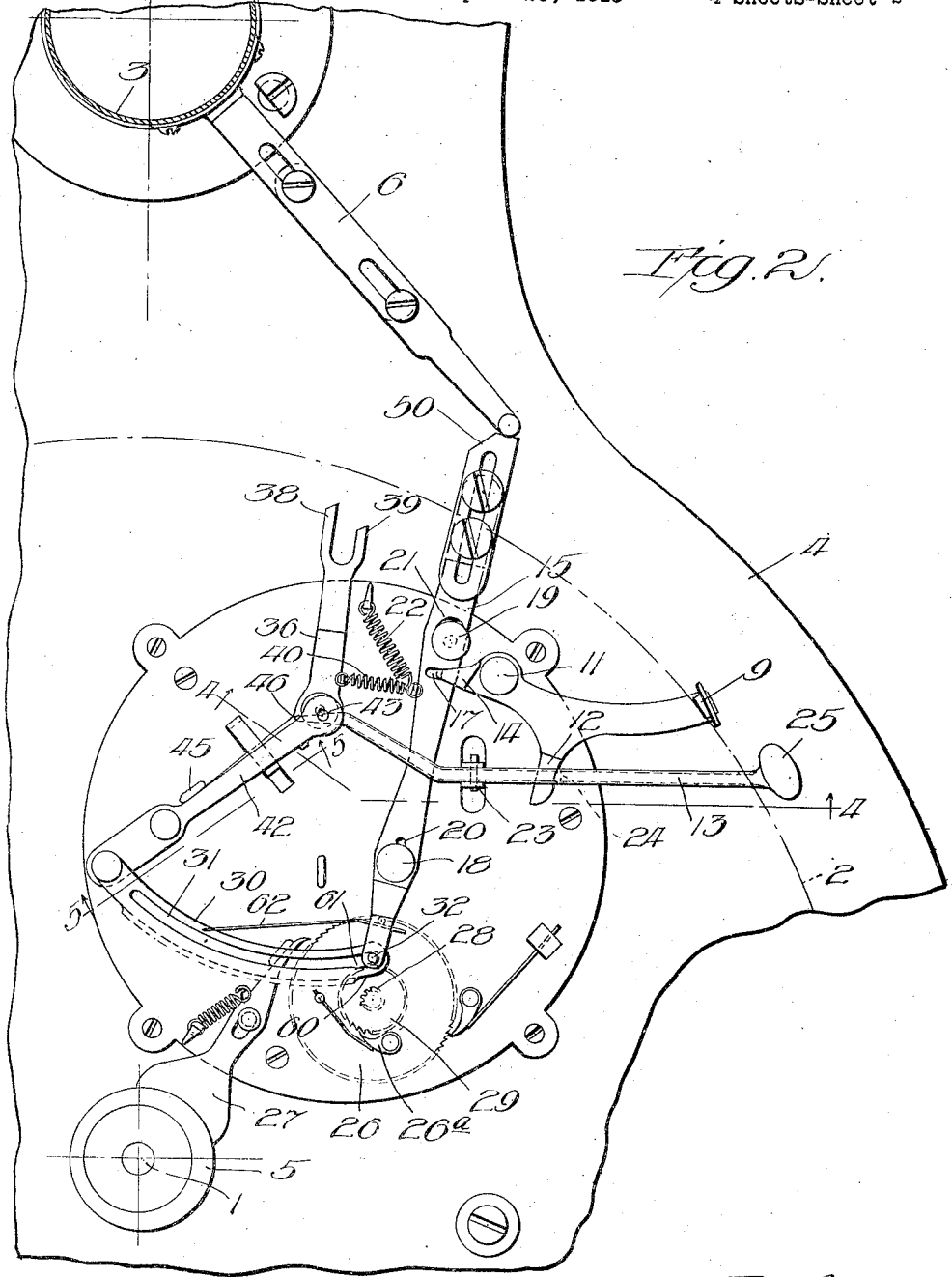
Fig. 2 is a view similar to Fig. 1, showing the parts in the positions which they occupy when the machine is ready to be started by the act of placing the needle into the groove at the beginning of the record, these positions being only slightly different from those indicated in dotted lines in Fig. 1.

The parts of the stop mechanism, aside from the actuator, are illustrated as mounted on a round flat plate or disc, 8, which may be attached on top of the casing of the machine beneath the rotatable table; the member 8 forming the bottom of a suitable flat protective or enclosing housing. In the arrangement shown, the thing that stops the machine is a brake comprising a shoe, 9, on the end of a lever, 10, pivotally supported upon the plate 8 at 11. The lever 10 has in effect three arms one of which carries the brake shoe, another of which, as indicated at 12, underlies a locking lever, 13, while the other, as indicated at 14, overlies a bar, 15, mounted on the plate 8 so as to have limited oscillatory and reciprocatory movements in a plane parallel with the plate. The arm, 14, of the brake lever has a finger, 16, which projects downwardly into a slot, 17, in the member 15. The member 15 extends almost entirely across the supporting plate 8 and at one end projects beyond the same and into proximity to the path of movement of the free end of the actuator member 6. The member 15 is secured in place by means of screws or pins, 18 and 19, which extend respectively through a slot, 20, elongated in the direction of the length of the member 15 and placed near the inner end of said member and through an enlarged hole, 21, which may conveniently be made circular and of a diameter considerably greater than the diameter of the shank of the pin member 19 so as to permit limited movements in all directions in the plane of the supporting plate. A spring, 22, secured at one end to the supporting plate and at the other end to the bar 15 tends constantly to move the latter longitudinally and outwardly, thus tending to swing the brake lever 10 in the clockwise direction as viewed in Figs. 1, 2 and 3 and press the brake shoe against the record-supporting table. The locking member 13 for the brake consists of a lever pivotally supported between its ends, as indicated at 23, so as to permit the lever to swing in a vertical plane; the lever having on its under side an outwardly directed shoulder, 24, in position to drop behind the inner edge of the arm 12 of the brake lever when the brake is fully off and thus prevent the brake from being applied until the locking lever is operated. The locking lever may be continued far enough beyond the edge of the supporting plate to permit it to carry a finger piece, 25, which will be within easy reach of one wishing to stop the machine.

In the vicinity of the inner end of the bar 15 is a ratchet wheel, 26, which is adapted to be moved step by step by means of a suitable spring-held pawl, 27, mounted on the supporting plate in position to engage with and be actuated by the eccentric 5 against the tension of its spring. The pawl moves back and forth during each revolution of the main shaft and therefore through each revolution of the record, and thus causes the ratchet wheel to be moved constantly in one direction step by step. Coaxial with and immediately above the ratchet wheel is a small pinion, 28, having connected therewith or forming part thereof a ratchet wheel, 29, smaller in diameter than the underlying ratchet wheel. A spring-pressed pawl, 26ª, carried by the ratchet wheel 26 and engaging with the teeth of the wheel 29, forms a driving connection which causes the pinion 28 to be moved ahead with the ratchet wheel 26 or, if occasion demands, to move ahead more rapidly than does the ratchet wheel 26 or else continuously instead of by intermittent movement.

With the pinion 28 there is adapted to mesh a segmental rack, 30, which, while a record is being played, is adapted to be moved forward in the same direction and at the same speed that the pinion 28 tends to move it; or, looking at it in another way, the pinion 28, driven in the manner heretofore described, drives the rack at the same speed and in the same direction that the actuating member 6, as will hereinafter be explained, tends to drive it. The rack is provided with a slot, 31, extending lengthwise of the same, and a pin, 32, carried on the inner end of the bar 15 extends through this slot, serving as a support for one end of the rack, as a guide, and also as a means to move the rack into and out of engagement with the pinion as the bar 15 is shifted longitudinally. The rack is pivotally connected at one end, as indicated at 33, to the free end of an arm or finger, 34, hinged, as indicated at 35, on one end of a lever, 36, which is pivotally supported at its middle on the supporting plate so as to swing in a plane parallel with and just above the supporting plate; the pivotal axis of the lever 36 being represented by the pin, 37, which, for purposes to be hereinafter explained, projects somewhat above the top of the lever. At the other end of the lever 36 is a two-prong fork having on the side toward the bar 15 a short prong, 38, and on the opposite side a longer prong, 39. A spring, 40, connected at its ends to the lever 36 and the bar 15 tends constantly to draw the forked end of the lever and the bar toward each other. From the inner end of the member 34 extends a leaf spring, 42, whose free end overlies the pin 37 and contains a hole, 43, as large as and preferably somewhat larger than the pin so as to permit the pin to enter the hole when brought into registration therewith. For the purpose of convenience in manufacture the leaf spring may be continued out over the arm 34 so that the two pivotal connections 33 and 35 will serve also the purpose of securing the leaf spring in place. A cam stop, 44, is arranged on the supporting plate in position to be engaged by the leaf spring 42 when the lever 36 is moved in the clockwise direction to one of its limits. This cam stop, as best shown in Figs. 8 and 9, is so shaped that it arrests the progress of the leaf spring and at the same time raises its free end. There is in the path of movement of the lever 36 a stop, 45, which does not engage with the lever so as to arrest its movement until the lever has moved through a slight angle after the leaf spring has been arrested by the cam stop and been raised thereby. The height through which the free end of the leaf spring 42 is raised, is sufficient to carry it above the top of the pin 37 so that the slight relative angular movement between the spring and the lever brings the hole 43 in the leaf spring out of registration with the pin 37 and, when the lever is again swung in the counterclockwise direction, the free end of the leaf spring will be held raised by reason of the fact that it rests upon the top of the pin 37. The brake locking lever, 13, has its inner end, 46, projecting past the pin 37 between the top of the lever 36 and the under side of the leaf spring. The parts are so proportioned that when the leaf spring is shifted upon the supporting lever until the hole therein comes into registration with the pin 37, the free end of the spring drops down upon the inner end of the brake locking lever, throwing up the outer end of the latter, and releasing the brake lever so that the brake will be automatically applied. It will be seen that the brake is applied through the action of the spring 22 which is under tension and, whenever the brake lever is unlocked, draws the bar 15 outwardly. This movement of the bar 15 not only swings the brake lever into a braking position, but also draws the rack 30 away from the pinion 28.

The attachment is secured to the casing of the machine in such a position that the free end of the actuator 6 enters the fork in the outer end of the lever 36 and swings this lever in the counterclockwise direction while the record is being played; the segmental rack being preferably of a greater angular length than the maximum angle through which the actuating lever therefor will be turned while a record of the largest size is being played. The parts are so proportioned, that when the bar 15 is pushed inwardly far enough to permit the brake-locking lever to drop into locking position, the segmental rack will be carried into contact with the pinion 28. In Fig. 3 the parts are shown in full lines just after the brake has been thrown off and the segmental rack brought into position to mesh with the driving pinion. As the reproducer arm swings around, carrying the needle toward the center of the record, the parts approach the positions indicated in dotted lines in Fig. 3. Assuming just as the parts approach the positions shown in dotted lines in Fig. 3 the needle reaches the last groove in the record and therefore cannot travel farther toward the center. It will be seen that the swinging movement of the reproducer arm and therefore the swinging movement of the lever 36 are both arrested. However, the record continues to revolve and the eccentric on the main shaft, acting through the pawl 27 continues to drive the pinion 28 and through it the segmental rack. The rack is permitted to move independently of the lever 36 because of being mounted on the swinging arm carried by the lever. During such continued independent movement of the rack the leaf spring, 42, is shifted until finally the hole therein comes into registration with the pin 37, allowing the free end of the leaf spring to drop down and trip the locking lever for the brake. As soon as this occurs the brake is applied and simultaneously the rack is drawn away from the driving pinion so that the rack may be returned freely to the starting point, as indicated in dotted lines in Fig. 1, when the reproducer arm is swung back to carry the needle off the edge of the record. As the reproducer arm swings outwardly, the actuator 6 leaves the fork in the end of the lever 36, the short prong, 38, permitting this, and thereafter it moves past the outer end of the bar 15 which is so positioned and which is preferably provided with a beveled corner, as indicated at 50, so that the bar yields as indicated in dotted lines in Fig. 1, to permit the actuator 6 to pass beyond the same to the position indicated in full lines in Fig. 2. When the parts reach the positions shown in Fig. 2, the leaf spring has been set so that when the brake lever is swung around into its release position, there is nothing to prevent the brake lock from dropping down into locking position, but the segmental rack is still out of engagement with the actuating pinion. When the machine is to be started, the reproducer arm is swung so as to bring the needle to the beginning of the record; this movement causing the bar 15 to be pushed inwardly by the actuator 6 far enough to swing the brake into its release position and engage the segmental rack with the pinion. As soon as this occurs, the shoulder on the locking lever 13 drops behind the arm 12 on the brake lever and therefore locks the brake in its release position and the bar in the position in which it maintains the rack in engagement with its pinion. The conditions are now those illustrated in Fig. 3, everything being set to apply the brake whenever the swinging movement of the reproducer arm, after the actuator 6 has engaged the fork in the end of the lever 36, ceases while the machine is running.

While the two elements of the differential actuator must both be acting on the segmental rack whenever the needle reaches the innermost groove in any record, a wide latitude may be allowed in selecting the point at which the interconnection of the parts must begin. In other words, as long as the mechanism of the stop device is ready to stop the machine when the end of a record is reached it makes no difference how long it has been ready so to act. Consequently, it is not necessary that the segmental rack be set in motion at the very beginning of a record of the largest size or even at the beginning of a record of the smallest size. In the arrangement shown, the actuator 6 does not engage the fork until the actuator has travelled more than half the angular distance from the brake-releasing or starting point (full lines in Fig. 3) toward the opposite limit of its movement. As long as the actuator element carried by the reproducer arm is travelling idly it is not necessary that the segmental rack be driven by the other actuating element. I have therefore cut away the teeth of the rack at the free end, as indicated at 60, so that the teeth of the rack do not mesh with the pinion when the mechanism has been set as shown in full lines in Fig. 3 and therefore the pinion is driven without affecting the rack while the first part of the record is being played. When the actuator 6 engages the fork, the segment begins to move and is carried forward by the lever 36 until the teeth mesh with the teeth on the pinion. It is desirable that the segment be permitted to yield a little at the instant it is attempted to mesh its teeth with those of the pinion, because the two sets of teeth may not at that instant be in exact registration. I therefore widen the slot 31 somewhat in the vicinity of the mutilated portion at the advance end of the rack, as indicated at 61, so as to permit the rack, while the pin 32 lies in the widened portion, to move away from the pinion. A light spring, 62, placed between the rack and the bar 15 tends to press the segment yieldingly toward the pinion so that any yielding movement of the segment at the time it is brought into mesh with the pinion is against the tension of this spring.

It will be seen that while, as heretofore explained, the operation will be satisfactory if the tendency is for the pinion 28 to be driven at exactly the same speed by both actuators, it would be very difficult to make the parts so accurately and keep them in such perfect repair that there would not occur at some point or other, during the playing of a record, such a differential action as to cause the brake to be applied unintentionally. Furthermore, records of different makes have different spacings between the centers of the grooves or spirals. Thus, a record of one kind may have in the neighborhood of one hundred grooves or spirals to the inch while another record may have almost two hundred grooves or spirals to the inch. Therefore, in order to make the attachment of universal application, it is necessary that the speed at which the segment is driven from the reproducer arm when a record having a maximum number of grooves or spirals to the inch is being played be sufficient to keep the segment moving ahead with at least the same speed that the pinion tends to drive it ahead. However, because of the other conditions, that is, the necessity for fine adjustment and perfect repair, if the segment is moved ahead by the reproducer arm at only the exact speed at which the pinion tends to drive it, the parts are preferably so proportioned that the segment is always moved ahead faster than it can be driven by means of the pinion so that the pinion will be carried ahead by the segment a little faster than the actuating pawl tends to drive it.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a controlling mechanism for a graphophone, the combination with a traveling arm and a member movably relatively thereto, of a two-position controller, a sliding bar connected to said controller, a spring for moving said bar in one direction, a part mounted on said traveling arm in position to engage with said bar and move it against the tension of the spring when the traveling arm is brought into position to place the needle on a record, a lock device for holding said bar in the position into which it is moved by the traveling arm, a lever adapted to be moved by the traveling arm as the latter is swung toward the center of the record, and mechanism controlled by said member movable relatively to the traveling arm and including a part interconnected between said bar and said lever for tripping said lock device and permitting the spring to move the bar.

2. In a controlling mechanism for a graphophone, the combination with a traveling arm and a member movable relatively thereto, of a two-position controller for the graphophone, a slidable bar connected to said controller, a spring for moving said bar in one direction to carry the controller into one of its positions, a lock device for holding the bar and the controller with the controller in said one position, a swinging lever, a segmental rack mounted at one end on one end of the lever in such a manner as to have a limited bodily movement relatively to the lever, a sliding connection between the free end of the segment and the inner end of said bar, a pinion adapted to mesh with said segment when the bar is in the position in which it is held by said lock device, means associated with said segment for releasing said lock device when the segment is moved bodily relatively to said lever, means actuated by said member movable relatively to said arm for turning said pinion in the same direction that the segment tends to turn the latter, and a part movable with said traveling arm constructed and arranged to engage with said bar and move it into the position in which it is locked by said lock device when the arm is shifted to place a needle on a record and to engage with said lever and cause the latter to swing during at least a portion of the movement of the traveling arm in opposite directions.

3. In a controlling mechanism for a graphophone, the combination with a traveling arm and a member movable relatively thereto, controlling mechanism including a controller for the aforesaid member and a part adapted to be driven by said member, a movably supported bar connected to said controller and to said part, and an element carried by said traveling arm and adapted to move said bar in one direction when said arm is moved outwardly to a predetermined point and to move said bar in a direction transverse to the aforesaid direction when the arm is moved inwardly a short distance from said predetermined point.

4. In a controlling mechanism for a graphophone, the combination with a traveling arm and a member movable relatively thereto, controlling mechanism including a controller for the aforesaid member and a part adapted to be driven by said member, a movably supported bar connected to said controller and to said part, and an element carried by said traveling arm and adapted to move said bar in one direction when said arm is moved outwardly to a predetermined point and to move said bar in a direction transverse to the aforesaid direction when the arm is moved inwardly a short distance from said predetermined point, a lever connected to the aforesaid part, said lever having a shoulder projecting into the path of said element so as to be engaged thereby when said arm is moved inwardly still farther.

5. In a controlling mechanism for a graphophone, the combination with a traveling arm and a member movable relatively thereto, controlling mechanism for the graphophone including a controller for said member and a segment adapted to be driven by said member, a bar connected to said controller and to said segment and adapted to move each from an idle position into a working position, said bar having a sliding movement and an oscillatory movement, and an element movable with said traveling arm adapted to produce a sliding movement of said bar when the arm is moved to a predetermined point in one direction and an oscillatory movement of the bar when the arm is moved to a predetermined point from the opposite direction.

6. In combination, a brake for a phonograph spindle, means under the control of the spindle for applying said brake and means controlled by the application of the brake for taking said first means out of the control of the spindle.

7. In a controlling mechanism of the character described, the combination of a traveling element, a rotating element, a stop device, means for actuating the same comprising two members, respectively moved by the traveling element and the rotating element, and means adapted to maintain the members in a given relation during the travel of the traveling element, and adapted to permit, upon the stopping of the traveling element, relative movement of one of the members from such given relation to actuate the stop device.

8. In a controlling mechanism of the character described, the combination of a traveling element, a rotating element, a stop device, actuating means therefor comprising a pair of members adapted to be moved in a given relation by the traveling element and the rotating element, and means for maintaining the members in a given spaced relation to each other during the travel of the traveling element, and adapted to permit, upon the stopping of the traveling element, relative movement of one of said members from such spaced relation to actuate the stop device.

9. In a controlling mechanism of the character described, the combination of a traveling element, a rotating element, a stop device, and actuating means therefor comprising a pair of members adapted to be moved by the traveling element and the rotating element, respectively, one of the members being apertured and the other having a pin adapted to maintain said members in a given spaced relation during the travel of the traveling element, and adapted to permit, upon the stopping of the traveling element, the first member to move with its aperture into register with the pin, thereby allowing relative movement of one of the members toward the other to actuate the stop device.

10. In a controlling mechanism of the character described, the combination of a traveling element, a rotating element, a stop device, actuating means therefor comprising a pair of members adapted to be moved by the traveling element and the rotating element, respectively, one of the members being apertured and the other of the members having a pin adapted to maintain the members in a given spaced relation during the travel of the traveling element, and adapted, upon stopping of the traveling element, to register with the aperture to permit relative movement of one of the members toward the other, and a member disposed between the first-named members and adapted as an incident to such relative movement to cause the stop device to become effective.

11. In a controlling mechanism of the character described, the combination of a traveling element, a rotating element, a stop device, actuating means therefor comprising a pair of members adapted to be moved by the traveling element and the rotating element, respectively, one of the members being apertured and the other having a pin adapted to maintain the members in a given spaced relation during the travel of the traveling element, and adapted, upon the stopping of the traveling element, to register with the aperture to permit relative movement of one of the members toward the other, and a pivoted member having one end disposed between the first-named members and provided with means adapted to maintain the stop device in inoperative position, and adapted, upon such relative movement between the first-named members, to pivotally move the last-named member to release the stop device.

12. In a controlling mechanism of the character described, a traveling element, a rotating element, a stop device, a member adapted to be moved by the traveling element during its travel, another member, and gearing for moving the last-named member in a given relation to the first-named member through movement of the rotating element, said gearing including a segmental rack and a pinion driven by the rotating element adapted to cause said rack to move the last-named member.

13. In a controlling mechanism of the character described, a traveling element, a rotating element, a stop device, a member adapted to be moved by the traveling element during its travel, another member, and gearing for moving the last-named member in a given relation to the first-named member through movement of the rotating element, said gearing including a segmental rack and a pinion driven by the rotating element adapted to cause said rack to move the last-named member, the rack being adapted to come into mesh with said pinion after a predetermined initial period of rotation of said rotating element.

14. In a controlling mechanism of the character described, a traveling element, a rotating element, a stop device, a member adapted to be moved by the traveling element during its travel, another member, and gearing for moving the last-named member in a given relation to the first-named member through movement of the rotating element, said gearing including a segmental rack and a pinion driven by the rotating element adapted to cause said rack to move the last-named member, the rack being adapted to come into mesh with said pinion after a predetermined initial period of travel of said traveling element.

15. In a controlling mechanism of the character described, a traveling element, a rotating element, a stop device, a member adapted to be moved by the traveling element during its travel, another member, gearing for moving the last-named member in a given relation to the first-named member through movement of the rotating element, said gearing including a segmental rack and a pinion driven by the rotating element adapted to cause said rack to move the last-named member, and means adapted to cause the movement of the rack to pinion-engaging position as an incident to the movement of the traveling element to starting position.

16. In a controlling mechanism of the character described, a traveling element, a rotating element, a stop device, a member adapted to be moved by the traveling element during its travel, another member, gearing for moving the last-named member in a given relation to the first-named member through movement of the rotating element, said gearing including a segmental rack and a pinion driven by the rotating element adapted to cause said rack to move the last-named member, means adapted to cause the movement of the rack to pinion-engaging position as an incident to the movement of the traveling element to starting position, and means for maintaining the rack out of engagement with the pinion during an initial movement of the traveling element from starting position.

17. In a controlling mechanism of the character described, a traveling element, a rotating element, a stop device, a member adapted to be moved by the traveling element during its travel, another member, gearing for moving the second-named member in a given relation to the first-named member through movement of the rotating element, said gearing including a segmental rack and a pinion driven by the rotating element adapted to engage the rack, and a member for moving the rack into and out of engagement with the pinion, the last-named member being adapted to be engaged by the traveling element upon its movement to starting position to move the rack to pinion-engaging position.

18. In a controlling mechanism of the character described, a traveling element, a rotating element, a stop device, a member adapted to be moved by the traveling element during its travel, another member, gearing for moving the second-named member in a given relation to said first-named member through movement of the rotating element, said gearing including a rack connected to the second-named member and a pinion driven by the rotating member adapted to be engaged by said rack, and a member to disengage the rack from the pinion and adapted to be engaged by the traveling element upon its advancing movement to starting position to cause the rack to be moved to pinion-engaging position after a predetermined initial travel of the traveling element.

19. In a controlling mechanism of the character described, the combination of a traveling element, a rotating element, a stop device, actuating means for the stop device, including a member adapted to be moved by the traveling element and a member adapted to be moved by the rotating element in a given relation, during the travel of the traveling element, and adapted to move relative thereto upon a stopping of the traveling element to actuate said stop device, and means for preventing actuation of the stop device during an initial period, said means being adapted to be operated by the traveling element upon its movement to starting position to move the stop device to inoperative position.

20. In combination, a rotating element, stop means therefor, means under the control of the rotating element for applying said stop means, and means controlled by the application of the stop means for taking said stop-applying means out of the control of the rotating element.

21. In combination, a rotating element, stop means therefor, means under the control of the rotating element for applying the stop means, and means controlled by the movement of the stop means for rendering the stop means inoperative during the initial period.

22. In combination, a rotating element, a traveling element, stop means for the rotating element under the control of the traveling element, the stop means being rendered inoperative during the initial period of travel of the traveling element, through non-cooperation between the traveling element and stop means, and means for rendering the traveling element and the stop means operatively related at the end of the initial period.

23. In combination, a rotating record-supporting element, a traveling element, and stop means adapted to be cooperatively related to said traveling element at a point intermediate the beginning and end of the record, and adapted to be actuated through cessation of the travel of the traveling element to stop the rotating element.

24. In combination, a traveling element, a rotating element, stop means for the rotating element, and actuating means for the stop means connected thereto only after a predetermined initial movement of the traveling element.

25. In combination, a traveling element, a rotating element, stop means for the rotating element, and actuating means for the stop means including two members, one controlled by the movement of the traveling element, the other by movement of the rotating element, the relative movement of said members when the traveling element stops being adapted to cause actuation of the stop means.

26. In combination, a traveling element, a rotating element, stop means for the rotating element, and actuating means for the stop means adapted to be operatively connected to the rotating element and to be disconnected therefrom on movement of the traveling element toward its outer position.

27. In combination, a rotating element, a traveling element, stop means for the rotating element, and actuating means for the stop means adapted to be operatively connected to the rotating element and to be disconnected therefrom incidental to movement of the traveling element to an inner position.

28. In combination, a rotating element, a traveling element, stop means for the rotating element, and actuating means for the stop means adapted to be operatively connected to the rotating element and to be disconnected therefrom upon actuation of the stop means.

29. In combination, a rotating element, a traveling element, stop means for the rotating element, release means for the stop means, and actuating means for the release means adapted to be operatively connected to the rotating element and to be disconnected therefrom by movement of the traveling element toward its inner and outer positions.

In testimony whereof, I sign this specification.

FRANK F. AKERLY,